US011425051B2

(12) United States Patent
Xia et al.

(10) Patent No.: US 11,425,051 B2
(45) Date of Patent: Aug. 23, 2022

(54) FLOW CONTROL METHOD AND SYSTEM, AND DEVICE

(71) Applicant: HUAWEI TECHNOLOGIES CO., LTD., Guangdong (CN)

(72) Inventors: Nu Xia, Nanjing (CN); Jinhui Zhang, Nanjing (CN); Qikun Wei, Nanjing (CN)

(73) Assignee: HUAWEI TECHNOLOGIES CO., LTD., Guangdong (CN)

(*) Notice: Subject to any disclaimer, the term of this patent is extended or adjusted under 35 U.S.C. 154(b) by 149 days.

(21) Appl. No.: 16/698,575

(22) Filed: Nov. 27, 2019

(65) Prior Publication Data
US 2020/0099624 A1 Mar. 26, 2020

Related U.S. Application Data

(63) Continuation of application No. PCT/CN2017/120451, filed on Dec. 31, 2017.

(30) Foreign Application Priority Data

May 31, 2017 (CN) .......................... 201710399829.7

(51) Int. Cl.
H04L 47/25 (2022.01)
H04L 47/2416 (2022.01)
(Continued)

(52) U.S. Cl.
CPC .......... H04L 47/25 (2013.01); H04L 47/2416 (2013.01); H04L 47/29 (2013.01);
(Continued)

(58) Field of Classification Search
CPC ..... H04L 47/25; H04L 47/2416; H04L 47/29; H04L 47/30; H04L 47/805; H04L 65/60;
(Continued)

(56) References Cited

U.S. PATENT DOCUMENTS 7,372,814 B1 * 5/2008 Chiruvolu ............... H04L 43/16
370/235
2003/0165150 A1 9/2003 Zimmermann et al.
(Continued)

FOREIGN PATENT DOCUMENTS

CN 101098301 A 1/2008
CN 101150521 A 3/2008
(Continued)

OTHER PUBLICATIONS

Tomoo Takahara et al. Discussion of 400GbE DMT level diagram for realistic implementation, IEEE802.3 Ottawa Interim meeting Sep. 2014.
(Continued)

Primary Examiner — Ian N Moore
Assistant Examiner — Rushil Parimal Sampat
(74) Attorney, Agent, or Firm — Womble Bond Dickinson (US) LLP

(57) ABSTRACT

A flow control method and system, and a device are provided to implement flow control in a process of transmitting a media stream between devices. The method includes: receiving, by a first device, a media stream that is sent by a second device at a first rate; instructing based on a rate of a media stream in a first time period in which a buffer usage rises from a first threshold to a second threshold, the second device to send a media stream to the first device at a second rate which is less than the first rate; instructing based on a rate of a media stream in a second time period in which the buffer usage rises from the second threshold to a third threshold, the second device to send a media stream to the first device at a third rate which is not greater than the second rate.

14 Claims, 6 Drawing Sheets

(51) Int. Cl.
*H04L 47/10* (2022.01)
*H04L 47/30* (2022.01)
*H04L 47/80* (2022.01)
*H04L 65/60* (2022.01)

(52) U.S. Cl.
CPC ............ *H04L 47/30* (2013.01); *H04L 47/805* (2013.01); *H04L 65/60* (2013.01)

(58) Field of Classification Search
CPC ................. H04L 65/607; H04L 65/608; H04L 65/602; H04L 65/601; H04L 43/0876; H04L 43/0894; H04L 47/24; H04L 65/105; H04L 65/4084; H04L 65/604; H04L 65/80; H04L 41/147; H04L 43/0888; H04L 47/38; G06F 16/43; G06F 16/903; G06F 17/30964
See application file for complete search history.

(56) References Cited

U.S. PATENT DOCUMENTS

| | | | |
|---|---|---|---|
| 2006/0039400 | A1 | 2/2006 | Mukhopadhyay et al. |
| 2009/0080334 | A1 | 3/2009 | Decusatis et al. |
| 2010/0091683 | A1 | 4/2010 | Shimizu |
| 2015/0032851 | A1* | 1/2015 | Lieber .................. H04L 65/608 709/219 |
| 2016/0065642 | A1* | 3/2016 | Burnette ............. H04L 65/4084 709/217 |
| 2016/0080237 | A1* | 3/2016 | Halepovic ............... H04L 65/80 709/224 |

FOREIGN PATENT DOCUMENTS

| | | |
|---|---|---|
| CN | 101272331 A | 9/2008 |
| CN | 101621833 A | 1/2010 |
| CN | 101959245 A | 1/2011 |
| CN | 103152192 A | 6/2013 |
| CN | 105610820 A | 5/2016 |
| CN | 106612238 A | 5/2017 |

OTHER PUBLICATIONS

IEEE Std 802.1p-2010,IEEE Standard for Information technology—Telecommunications and information exchange between systems—Local and metropolitan area networks—Specific requirements;Part 11:Wireless LAN Medium Access Control (MAC) and Physical Layer (PHY) Specifications;Amendment 6:Wireless Acccess in Vehicular Environments,total 51 pages.

* cited by examiner

| Destination MAC | Source MAC |
|---|---|
| Length/Type | Opcode |
| MAC Control Parameters ||
| Reserved field ||
| FCS ||

FIG. 4

| Destination MAC | Source MAC |
|---|---|
| Length/Type | PFC |
| EN | Time[0] |
| | ⋮ |
| Reserved field | Time[7] |
| FCS ||

FIG. 5

FLOW CONTROL METHOD AND SYSTEM, AND DEVICE

CROSS-REFERENCE TO RELATED APPLICATIONS

This application is a continuation of International Application No. PCT/CN2017/120451, filed on Dec. 31, 2017, which claims priority to Chinese Patent Application No. 201710399829.7, filed on May 31, 2017. The disclosures of the aforementioned applications are hereby incorporated by reference in their entireties.

TECHNICAL FIELD

This application relates to the field of communications technologies, and in particular, to a flow control method and system, and a device.

BACKGROUND

In a network on which a switching device is deployed, a traffic overload phenomenon may occur in a process of transmitting a media stream between devices. Traffic overload may cause problems such as data packet discarding by a device, a data transmission delay, a decrease in an effective network throughput, and high consumption of resources used for buffering data and retransmitting data. Therefore, resolving a traffic overload problem in the network is essential.

To resolve the traffic overload problem, a flow control solution based on a pause frame is proposed at present. In this solution, when traffic overload occurs, a receive end device instructs, by using a PAUSE frame, a transmit end device to suspend sending a media stream to the receive end device, and the transmit end device suspends sending the media stream based on the instruction of the PAUSE frame. Consequently, the transmit end device is unprepared, and discards excessive data packets. That the transmit end device is an intermediate device on a media stream transmission link is used as an example. After the transmit end device suspends, based on the instruction of the PAUSE frame of the receive end device, sending the media stream to the receive end device, because the transmit end device still continues receiving a media stream sent by an upstream device, a buffer of the transmit end device overflows, and the transmit end device discards a data packet received from the upstream device.

In conclusion, in the existing flow control solution, there is a problem that when traffic overload occurs on the receive end device, the transmit end device suspends sending a media stream to the receive end device and consequently discards a data packet.

SUMMARY

Embodiments of this application provide a flow control method and system, and a device, to implement flow control in a process of transmitting a media stream between devices.

According to a first aspect, an embodiment of this application provides a flow control method, including:

receiving, by a first device, a media stream that is sent by a second device at a first rate;

when determining that a buffer usage rises from a first threshold to a second threshold, instructing, by the first device based on a rate that is of a media stream and that is detected in a first time period in which the buffer usage rises from the first threshold to the second threshold, the second device to send a media stream to the first device at a second rate, where the second rate is less than the first rate; and when determining that the buffer usage rises from the second threshold to a third threshold, instructing, by the first device based on a rate that is of a media stream and that is detected in a second time period in which the buffer usage rises from the second threshold to the third threshold, the second device to send a media stream to the first device at a third rate, where the third rate is not greater than the second rate.

In the foregoing method, a plurality of buffer usage thresholds are set, to determine whether a traffic overload phenomenon is to occur on the first device or whether a traffic overload phenomenon has occurred on the first device. When the buffer usage of the first device rises from the first threshold to the second threshold, it indicates that the traffic overload phenomenon may be to occur on the first device. In this case, the first device instructs the second device to send the media stream to the first device at the second rate, where the second rate is less than the first rate, so that the rate at which the second device sends the media stream is reduced before the traffic overload phenomenon occurs on the first device, thereby reducing a probability that the traffic overload phenomenon occurs on the first device. When the buffer usage of the first device rises from the second threshold to the third threshold, it indicates that the traffic overload phenomenon may have occurred on the first device. In this case, the first device instructs the second device to send the media stream to the first device at the third rate, where the third rate is usually less than the second rate, so that the rate at which the second device sends the media stream is further reduced when the traffic overload phenomenon occurs on the first device, thereby alleviating the traffic overload phenomenon on the first device.

In the foregoing method, flow control in a process of transmitting a media stream between devices can be implemented, and in addition, the following problem in an existing flow control solution is avoided: A transmit end device discards a data packet because the transmit end device suspends sending a media stream when traffic overload occurs on a receive end device.

In one embodiment, the second rate is an average rate at which a media stream flows out of a buffer in the first time period in which the buffer usage rises from the first threshold to the second threshold, and the average rate at which the media stream flows out of the buffer in the first time period may be understood as an average rate at which the first device sends the media stream to a downstream device of the first device in the first time period. A method for determining the second rate includes: separately determining the first time period T1 in which the buffer usage rises from the first threshold to the second threshold, and traffic O1 of the media stream that flows out of the buffer in the first time period, and using a ratio of O1 to T1, that is, V1=O1/T1, as the second rate.

In one embodiment, before instructing the second device to send the media stream to the first device at the second rate, the first device may determine, based on the rate that is of the media stream and that is detected in the first time period in which the buffer usage rises from the first threshold to the second threshold, whether a rate difference is greater than a fourth threshold, and the rate difference is a difference between an average rate at which a media stream flows in the buffer in the first time period and the average rate at which the media stream flows out of the buffer in the first time period. If the determined rate difference is greater than the fourth threshold, the first device instructs the second device to send the media stream to the first device at the second rate. If the determined rate difference is not greater than the fourth threshold, the first device does not need to instruct the second device to send the media stream to the first device at the second rate, and the second device continues sending the media stream to the first device at the first rate.

In one embodiment, the third rate is an average rate at which a media stream flows out of the buffer in the second time period in which the buffer usage rises from the second threshold to the third threshold, and the average rate at which the media stream flows out of the buffer in the second time period may be understood as an average rate at which the first device sends the media stream to a downstream device of the first device in the second time period. A method for determining the third rate includes: separately determining the second time period T2 in which the buffer usage rises from the second threshold to the third threshold, and traffic O2 of the media stream that flows out of the buffer in the second time period, to obtain a ratio of O2 to T2 through calculation, that is, V2=O2/T2; if V2 is less than V1, using V2 as the third rate, where the third rate is less than the second rate in this case; and if V2 is greater than or equal to V1, using V1 as the third rate, where the third rate is equal to the second rate in this case. When the third rate is equal to the second rate, the first device may instruct the second device to send the media stream to the first device at the third rate, or the first device may not notify the second device of a rate of sending the media stream to the first device. In this case, the second device continues sending the media stream to the first device at the second rate.

In one embodiment, the buffer may include all buffers of one port. In one embodiment, in a scenario in which only one virtual channel is created on a transmission link between one port of the first device and one port of the second device, the buffer is all buffers used to buffer a media stream on one port of the first device, and the rate at which the second device sends the media stream to the first device is a rate at which the second device sends the media stream by using the transmission link between the second device and the first device.

The buffer may alternatively include a buffer used to buffer a media stream corresponding to a specified priority in all buffers of one port. In one embodiment, in a scenario in which a plurality of virtual channels are created on a transmission link between one port of the first device and one port of the second device, the buffer is a buffer used to buffer a media stream corresponding to a specified priority in all buffers of one port of the first device, and the rate at which the second device sends the media stream to the first device is a rate at which the second device sends, by using a virtual channel on the transmission link between the second device and the first device, the media stream corresponding to the specified priority.

In one embodiment, the method further includes:

when determining that the buffer usage falls from the third threshold to the second threshold, instructing, by the first device based on a rate that is of a media stream and that is detected in a third time period in which the buffer usage falls from the third threshold to the second threshold, the second device to send a media stream to the first device at a fourth rate, where the fourth rate is greater than the third rate; and when determining that the buffer usage falls from the second threshold to the first threshold, instructing, by the first device based on a rate that is of a media stream and that is detected in a fourth time period in which the buffer usage falls from the second threshold to the first threshold, the second device to send a media stream to the first device at a fifth rate, where the fifth rate is greater than the fourth rate.

By using the foregoing method, after the traffic overload phenomenon on the first device is alleviated, the rate at which the second device sends the media stream to the first device may be increased in two phases, to recover normal media stream transmission between the first device and the second device. Compared with the prior art, in the foregoing method, the following problem can be avoided: After the traffic overload phenomenon on the first device is alleviated, the traffic overload phenomenon still occurs on the first device because the second device directly restores the first rate to send the media stream to the first device.

In one embodiment, the first device sends, to the second device, a pause (PAUSE) frame that carries a specified rate, to instruct the second device to send a media stream to the first device at the specified rate. The specified rate is any one of the second rate to the fifth rate in the foregoing method.

In this way, the PAUSE frame carries the specified rate, so that the first device instructs the second device to send the media stream to the first device at the specified rate without changing an existing frame format of the PAUSE frame, thereby fully exploiting and playing a function of the PAUSE frame. After receiving the PAUSE frame that carries the specified rate, the second device adjusts the rate of sending the media stream to the first device to the specified rate, to implement flow control in the process of transmitting the media stream between the first device and the second device.

According to a second aspect, an embodiment of this application provides a flow control method, including:

sending, by a second device, a media stream to a first device at a first rate;

after receiving a message that is sent by the first device and that is used to instruct the second device to send a media stream to the first device at a second rate, sending, by the second device, the media stream to the first device at the second rate, where the second rate is less than the first rate; and after receiving a message that is sent by the first device and that is used to instruct the second device to send a media stream to the first device at a third rate, sending, by the second device, the media stream to the first device at the third rate, where the third rate is not greater than the second rate.

In the foregoing method, after receiving the message that is sent by the first device and carries a specified rate, the second device sends a media stream to the first device at the specified rate. In the foregoing method, the specified rate is the second rate or the third rate. Because the second rate is determined by the first device based on a case in which a traffic overload phenomenon is to occur and a detected rate of the media stream, the second device sends the media stream to the first device at the second rate, to reduce a probability that the traffic overload phenomenon occurs on the first device. Because the third rate is determined by the first device based on a case in which the traffic overload phenomenon has occurred and a detected rate of the media stream, the second device sends the media stream to the first device at the third rate, to alleviate the traffic overload phenomenon on the first device.

In one embodiment, the second rate is an average rate at which a media stream flows out of a buffer in a first time period in which a buffer usage of the first device rises from a first threshold to a second threshold, and the average rate at which the media stream flows out of the buffer in the first time period may be understood as an average rate at which the first device sends the media stream to a downstream device of the first device in the first time period.

In one embodiment, the third rate is an average rate at which a media stream flows out of the buffer in a second time period in which the buffer usage of the first device rises from the second threshold to a third threshold, and the average rate at which the media stream flows out of the buffer in the second time period may be understood as an average rate at which the first device sends the media stream to a downstream device of the first device in the second time period.

In one embodiment, the buffer may include all buffers of one port. In one embodiment, in a scenario in which only one virtual channel is created on a transmission link between one port of the first device and one port of the second device, the buffer is all buffers used to buffer a media stream on one port of the first device, and the rate at which the second device sends the media stream to the first device is a rate at which the second device sends the media stream by using the transmission link between the second device and the first device.

The buffer may alternatively include a buffer used to buffer a media stream corresponding to a specified priority in all buffers of one port. In one embodiment, in a scenario in which a plurality of virtual channels are created on a transmission link between one port of the first device and one port of the second device, the buffer is a buffer used to buffer a media stream corresponding to a specified priority in all buffers of one port of the first device, and the rate at which the second device sends the media stream to the first device is a rate at which the second device sends, by using a virtual channel on the transmission link between the second device and the first device, the media stream corresponding to the specified priority.

In one embodiment, the receiving, by the second device, a message that is sent by the first device and that is used to instruct the second device to send a media stream to the first device at the second rate or the third rate includes:

receiving, by the second device, a pause (PAUSE) frame that is sent by the first device and that carries the second rate or the third rate.

In one embodiment, the method further includes:

after receiving a message that is sent by the first device and that is used to instruct the second device to send a media stream to the first device at a fourth rate, sending, by the second device, the media stream to the first device at the fourth rate, where the fourth rate is greater than the third rate; and after receiving a message that is sent by the first device and that is used to instruct the second device to send a media stream to the first device at a fifth rate, sending, by the second device, the media stream to the first device at the fifth rate, where the fifth rate is greater than the fourth rate.

By using the foregoing method, after the traffic overload phenomenon on the first device is alleviated, the rate at which the second device sends the media stream to the first device may be increased in two phases, to recover normal media stream transmission between the first device and the second device. Compared with the prior art, in the foregoing method, the following problem can be avoided: After the traffic overload phenomenon on the first device is alleviated, the traffic overload phenomenon still occurs on the first device because the second device directly restores the first rate to send the media stream to the first device.

In one embodiment, the second device receives a PAUSE frame that is sent by the first device and that carries a specified rate, so that the second device receives a message that is sent by the first device and that is used to instruct the second device to send a media stream to the first device at the specified rate, and the specified rate is any one of the second rate to the fifth rate in the foregoing method.

In this way, the PAUSE frame carries the specified rate, so that the first device instructs the second device to send the media stream to the first device at the specified rate without changing an existing frame format of the PAUSE frame, thereby fully exploiting and playing a function of the PAUSE frame. After receiving the PAUSE frame that carries the specified rate, the second device adjusts the rate of sending the media stream to the first device to the specified rate, to implement flow control in the process of transmitting the media stream between the first device and the second device.

According to a third aspect, an embodiment of this application provides a first device, including a processor, a transceiver, and a memory, where the processor is configured to read a program in the memory, to perform the following process:

receiving, by using the transceiver, a media stream that is sent by a second device at a first rate; when determining that a buffer usage of the first device rises from a first threshold to a second threshold, instructing, by using the transceiver based on a rate that is of a media stream and that is detected in a first time period in which the buffer usage rises from the first threshold to the second threshold, the second device to send a media stream to the first device at a second rate, where the second rate is less than the first rate; and when determining that the buffer usage rises from the second threshold to a third threshold, instructing, by using the transceiver based on a rate that is of a media stream and that is detected in a second time period in which the buffer usage rises from the second threshold to the third threshold, the second device to send a media stream to the first device at a third rate, where the third rate is not greater than the second rate; and the transceiver is configured to receive data and/or send data under control of the processor.

In one embodiment, the second rate is an average rate at which a media stream flows out of a buffer in the first time period.

In one embodiment, when instructing, by using the transceiver based on the rate that is of the media stream and that is detected in the first time period in which the buffer usage rises from the first threshold to the second threshold, the second device to send the media stream to the first device at the second rate, the processor is configured to:

when determining that a rate difference is greater than a fourth threshold, instruct, by using the transceiver, the second device to send the media stream to the first device at the second rate, where the rate difference is a difference between an average rate at which a media stream flows in the buffer in the first time period and the average rate at which the media stream flows out of the buffer in the first time period.

In one embodiment, the third rate is an average rate at which a media stream flows out of the buffer in the second time period.

In one embodiment, the buffer includes:

all buffers of one port; and/or a buffer used to buffer a media stream corresponding to a specified priority in all buffers of one port.

In one embodiment, when instructing, by using the transceiver, the second device to send the media stream to the first device at the second rate or the third rate, the processor is configured to:

send, to the second device by using the transceiver, a pause PAUSE frame that carries the second rate or the third rate.

In one embodiment, the processor is further configured to:

when determining that the buffer usage falls from the third threshold to the second threshold, instruct, by using the transceiver based on a rate that is of a media stream and that is detected in a third time period in which the buffer usage falls from the third threshold to the second threshold, the second device to send a media stream to the first device at a fourth rate, where the fourth rate is greater than the third rate; and when determining that the buffer usage falls from the second threshold to the first threshold, instruct, by using the transceiver based on a rate that is of a media stream and that is detected in a fourth time period in which the buffer usage falls from the second threshold to the first threshold, the second device to send a media stream to the first device at a fifth rate, where the fifth rate is greater than the fourth rate.

According to a fourth aspect, an embodiment of this application further provides a first device. The first device has a function of implementing behavior of the first device in the method provided in the first aspect. The function may be implemented by hardware, or may be implemented by hardware executing corresponding software. The hardware or the software includes one or more modules corresponding to the function.

In one embodiment, a structure of the first device includes a processing unit and a communications unit. The processing unit is configured to support the first device in performing the corresponding function in the method provided in the first aspect. The communications unit is configured to support communication between the first device and another device including a second device. The first device may further include a storage unit. The storage unit is configured to be coupled with the processing unit, and the storage unit stores a program instruction and data that are used for the first device. For example, the processing unit may be the processor in the third aspect, the communications unit may be the transceiver in the third aspect, and the storage unit may be the memory in the third aspect.

According to a fifth aspect, an embodiment of this application further provides a computer storage medium, configured to store a computer software instruction used by the first device in the foregoing aspects, where the computer software instruction includes a program designed for performing the foregoing aspects.

According to a sixth aspect, an embodiment of this application provides a second device, including a processor, a transceiver, and a memory, where the processor is configured to read a program in the memory, to perform the following process:

sending a media stream to a first device at a first rate by using the transceiver; after receiving, by using the transceiver, a message that is sent by the first device and that is used to instruct the second device to send a media stream to the first device at a second rate, sending, by using the transceiver, the media stream to the first device at the second rate, where the second rate is less than the first rate; and after receiving, by using the transceiver, a message that is sent by the first device and that is used to instruct the second device to send a media stream to the first device at a third rate, sending, by using the transceiver, the media stream to the first device at the third rate, where the third rate is not greater than the second rate; and the transceiver is configured to receive data and/or send data under control of the processor.

In one embodiment, the second rate is an average rate at which a media stream flows out of a buffer in a first time period in which a buffer usage of the first device rises from a first threshold to a second threshold.

In one embodiment, the third rate is an average rate at which a media stream flows out of the buffer in a second time period in which the buffer usage of the first device rises from the second threshold to a third threshold.

In one embodiment, the buffer includes:

all buffers of one port; and/or a buffer used to buffer a media stream corresponding to a specified priority in all buffers of one port.

In one embodiment, when receiving, by using the transceiver, the message that is sent by the first device and that is used to instruct the second device to send the media stream to the first device at the second rate or the third rate, the processor is configured to:

receive, by using the transceiver, a pause (PAUSE) frame that is sent by the first device and that carries the second rate or the third rate.

In one embodiment, the processor is further configured to:

after receiving, by using the transceiver, a message that is sent by the first device and that is used to instruct the second device to send a media stream to the first device at a fourth rate, send the media stream to the first device at the fourth rate by using the transceiver, where the fourth rate is greater than the third rate; and after receiving, by using the transceiver, a message that is sent by the first device and that is used to instruct the second device to send a media stream to the first device at a fifth rate, send the media stream to the first device at the fifth rate by using the transceiver, where the fifth rate is greater than the fourth rate.

According to a seventh aspect, an embodiment of this application further provides a second device. The second device has a function of implementing behavior of the second device in the method provided in the second aspect. The function may be implemented by hardware, or may be implemented by hardware executing corresponding software. The hardware or the software includes one or more modules corresponding to the function.

In one embodiment, a structure of the second device includes a processing unit and a communications unit. The processing unit is configured to support the second device in performing the corresponding function in the method provided in the second aspect. The communications unit is configured to support communication between the second device and another device including a first device. The second device may further include a storage unit. The storage unit is configured to be coupled with the processing unit, and the storage unit stores a program instruction and data that are used for the second device. For example, the processing unit may be the processor in the sixth aspect, the communications unit may be the transceiver in the sixth aspect, and the storage unit may be the memory in the sixth aspect.

According to an eighth aspect, an embodiment of this application further provides a computer storage medium, configured to store a computer software instruction used by the second device in the foregoing aspects, where the computer software instruction includes a program designed for performing the foregoing aspects.

According to a ninth aspect, an embodiment of this application provides a flow control system, including a first device and a second device, where the second device is configured to send a media stream to the first device at a first rate;

the first device is configured to: when determining that a buffer usage rises from a first threshold to a second threshold, send, to the second device based on a rate that is of a media stream and that is detected in a first time period in which the buffer usage rises from the first threshold to the second threshold, a first message that is used to instruct the second device to send a media stream to the first device at a second rate, where the second rate is less than the first rate; and when determining that the buffer usage rises from the second threshold to a third threshold, send, to the second device based on a rate that is of a media stream and that is detected in a second time period in which the buffer usage rises from the second threshold to the third threshold, a second message that is used to instruct the second device to send a media stream to the first device at a third rate, where the third rate is not greater than the second rate; and the second device is further configured to: after receiving the first message, send the media stream to the first device at the second rate; and after receiving the second message, send the media stream to the first device at the third rate.

According to the technical solutions provided in the embodiments of this application, flow control in the process of transmitting the media stream between the devices can be implemented. In addition, with the technical solutions provided in the embodiments of this application, the following case in the existing flow control solution can be avoided: The transmit end device suspends sending the media stream to the receive end device when traffic overload occurs on the receive end device. Therefore, by using the technical solutions provided in the embodiments of this application, the following problem in the existing flow control solution can be avoided: The transmit end device discards a data packet because the transmit end device suspends sending the media stream when traffic overload occurs on the receive end device.

BRIEF DESCRIPTION OF DRAWINGS

FIG. 4 is a schematic diagram of a format of a PAUSE frame according to an embodiment of this application;

FIG. 5 is a schematic diagram of a format of another PAUSE frame according to an embodiment of this application;

DESCRIPTION OF EMBODIMENTS

Embodiments of this application provide a flow control method and system, and a device, to implement flow control in a process of transmitting a media stream between devices. The method and the device are based on a same inventive concept. Because problem-resolving principles of the method and the device are similar, for implementation of the apparatus and the method, reference may be made to each other. No repeated description is provided.

Figure 1:
FIG. 1 is a schematic diagram of a network architecture in which a switching device is deployed according to an embodiment of this application.

The embodiments of this application are applicable to a network in which a switching device is deployed, such as a wireless access network (WAN), a local area network (LAN), or a wired network. The switching device may be a switch or a router. The switching device is configured to forward data for two network nodes connected to the switching device. A first device and a second device in the embodiments of this application respectively serve as a receiving device and a sending device of a media stream, and at least one of the first device and the second device is the switching device. A network in which a switching device is deployed in FIG. 1 is used as an example. The network includes a network node 1, a network node 2, and n switching devices used to transmit a media stream between the network node 1 and the network node 2, and n is a positive integer. The first device and the second device in the embodiments of this application may be respectively a switching device 1 and the network node 1, or may be respectively any two adjacent switching devices in the n switching devices, or may be respectively the network node 2 and a switching device n.

Figure 2A:
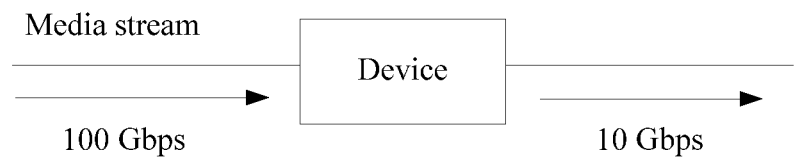
FIG. 2A is a schematic diagram of a media stream transmission process according to an embodiment of this application.
Figure 2B:
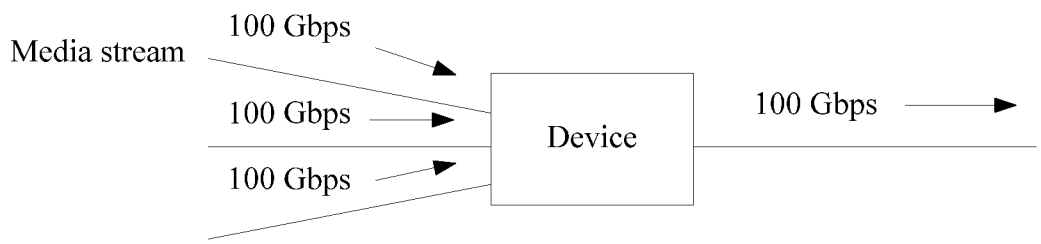
FIG. 2B is a schematic diagram of another media stream transmission process according to an embodiment of this application.

In the network in which the switching device is deployed, a traffic overload phenomenon may occur in a process of transmitting a media stream between devices, and the traffic overload phenomenon occurs on a port of a device. Media stream transmission processes shown in FIG. 2A and FIG. 2B may respectively describe two main causes for traffic overload. In FIG. 2A, a media stream enters a device from a high-speed link, and the device forwards the media stream by using a low-speed link. In this case, the traffic overload phenomenon may occur on the device due to a rate mismatch. In FIG. 2B, media streams enter a device at the same time from a plurality of ports. The device forwards the media streams by using one port that does not have enough bandwidth. In this case, the traffic overload phenomenon may occur on the device due to a data aggregation problem. When the traffic overload phenomenon occurs on the device, congestion in a buffer of the device causes data overflow. In this case, the device discards an incoming data packet until buffer congestion is eliminated. Discarding a data packet causes data transmission of a higher layer protocol or an application (such as video on demand or live broadcast) that requires reliable transmission to be interrupted for several seconds or a longer time. This severely affects user experience. The traffic overload phenomenon on the device causes the following adverse impact:

1. The device discards the data packet.
2. A data transmission delay and a delay jitter are increased. An excessively high transmission delay even causes data retransmission.
3. An effective network throughput is reduced.
4. Consumption of resources used for buffering data and retransmitting data is relatively high.

To avoid a traffic overload phenomenon in a process of transmitting a media stream between devices, the embodiments of this application provide a flow control method and system, and a device, and the traffic overload phenomenon is avoided by implementing flow control in the process of transmitting a media stream between devices. In the technical solutions provided in the embodiments of this application, the first device instructs, by determining the traffic overload phenomenon, the second device in phases to adjust a rate of sending a media stream to the first device.

Figure 3A:
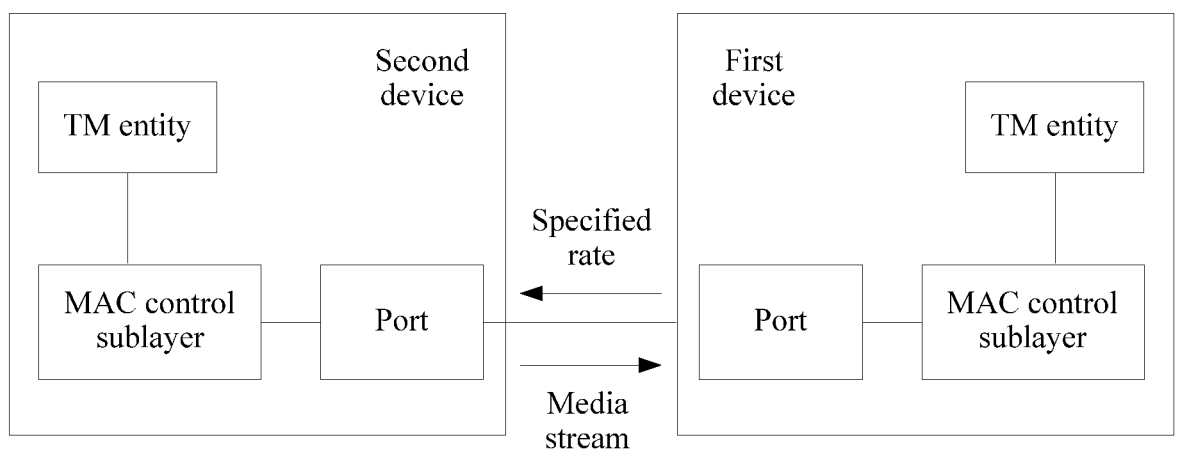
FIG. 3A is a schematic diagram of a system architecture according to an embodiment of this application.

The technical solutions provided in the embodiments of this application may be based on a system architecture shown in FIG. 3A. In the architecture, a media access control (MAC) control sublayer of the first device is configured to determine whether the traffic overload phenomenon is to occur or whether the traffic overload phenomenon has occurred on a port of the first device, and is configured to send, to the second device by using a port between the first device and the second device, a message that carries a specified rate. A MAC control sublayer of the second device obtains the specified rate, and delivers the specified rate to a traffic management (TM) entity. The TM entity adjusts, based on the specified rate, a rate at which a port of the second device sends a media stream, so that the second device adjusts the rate of sending the media stream to the first device.

The following describes the technical solutions provided in the embodiments of this application.

Figure 3B:
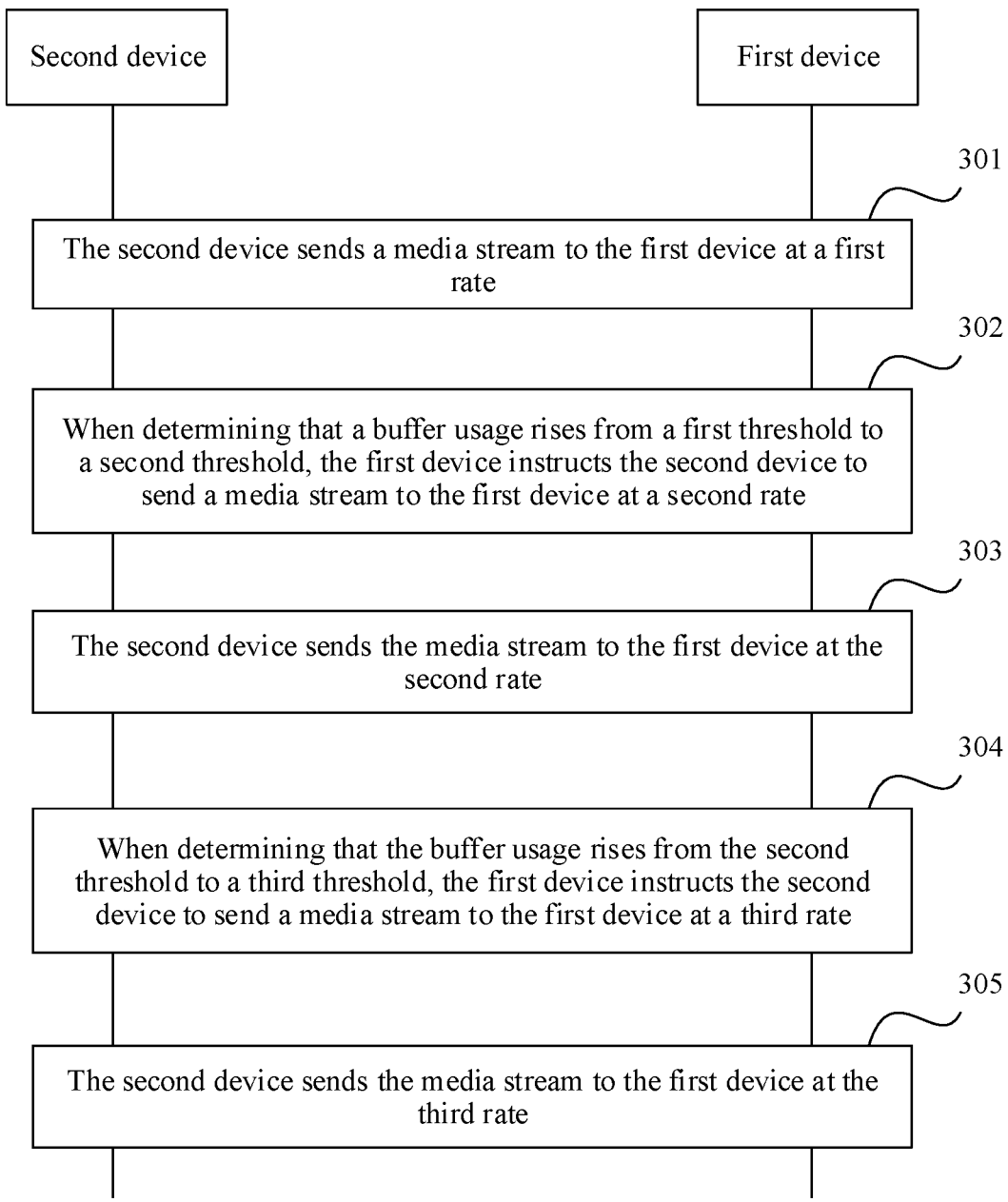
FIG. 3B is a schematic diagram of a flow control method procedure according to an embodiment of this application.

An embodiment of this application provides a flow control method. A first device and a second device in the method respectively serve as a receive end device and a transmit end device of a media stream. In the method, a plurality of buffer usage thresholds are set, to determine whether a traffic overload phenomenon is to occur or whether the traffic overload phenomenon has occurred on the first device. As shown in FIG. 3B, an interaction procedure between the first device and the second device in the flow control method provided in this embodiment of this application is as follows:

301. The second device sends a media stream to the first device at a first rate.

302. When determining that a buffer usage rises from a first threshold to a second threshold, the first device instructs, based on a rate that is of a media stream and that is detected in a first time period in which the buffer usage rises from the first threshold to the second threshold, the second device to send a media stream to the first device at a second rate, where the second rate is less than the first rate.

In this embodiment, in a scenario in which only one virtual channel is created on a transmission link between one port of the first device and one port of the second device, a buffer is all buffers used to buffer the media stream on one port of the first device. In this scenario, a rate at which the second device sends a media stream to the first device is a rate at which the second device sends the media stream by using a transmission link between the second device and the first device.

In a scenario in which a plurality of virtual channels are created on a transmission link between one port of the first device and one port of the second device, that eight virtual channels are created is used as an example. Each of the eight virtual channels is specified to be used to transmit a media stream corresponding to a priority. In this way, the eight virtual channels may be used to transmit media streams corresponding to eight different priorities. In this case, all buffers used to buffer a media stream on one port are divided into buffers corresponding to the eight different priorities, and a buffer in this embodiment is a buffer used to buffer a media stream corresponding to a specified priority in all buffers on one port of the first device. In this scenario, a rate at which the second device sends a media stream to the first device is a rate at which the second device sends, by using a virtual channel on a transmission link between the second device and the first device, the media stream corresponding to a specified priority. For the scenario in which a plurality of virtual channels are created on a transmission link, refer to the prior art. Details are not described herein.

The first threshold and the second threshold are two of the plurality of specified buffer usage thresholds in this embodiment, and the buffer usage of the first device is compared with the first threshold and the second threshold, to determine whether the traffic overload phenomenon is to occur on the first device. In part 302, when the buffer usage of the first device rises from the first threshold to the second threshold, it indicates that the traffic overload phenomenon may be to occur on the first device. In this case, the first device instructs, based on the rate that is of the media stream and that is detected in the first time period in which the buffer usage rises from the first threshold to the second threshold, the second device to send the media stream to the first device at the second rate, where the second rate is less than the first rate, so that the rate at which the second device sends the media stream is reduced before the traffic overload phenomenon occurs on the first device, thereby reducing a probability that the traffic overload phenomenon occurs on the first device. When the first threshold and the second threshold are set, excessively early reduction of the rate at which the second device sends the media stream to the first device should be avoided, to avoid impact on normal sending of the media stream by the second device to the first device. For example, the first threshold may be set to one third of the buffer, and the second threshold may be set to one half of the buffer.

In part 302, the first device instructs, based on the rate that is of the media stream and that is detected in the first time period in which the buffer usage rises from the first threshold to the second threshold, the second device to send the media stream to the first device at the second rate, and the second rate is equal to an average rate at which a media stream flows out of the buffer in the first time period. In this case, the second rate may be understood as an average rate at which the first device sends a media stream to a downstream device of the first device in the first time period. A method for determining the second rate includes: separately determining the first time period T1 in which the buffer usage rises from the first threshold to the second threshold, and traffic O1 of the media stream that flows out of the buffer in the first time period, and using a ratio of O1 to T1, that is, $V1=O1/T1$, as the second rate.

In part 302, before instructing the second device to send the media stream to the first device at the second rate, the first device may determine, based on the rate that is of the media stream and that is detected in the first time period in which the buffer usage rises from the first threshold to the second threshold, whether a rate difference is greater than a fourth threshold, and the rate difference is a difference between an average rate at which a media stream flows in the buffer in the first time period and the average rate at which the media stream flows out of the buffer in the first time period. The average rate of the media stream that flows in the buffer in the first time period may be understood as an average rate at which the second device sends the media stream to the first device in the first time period, and the average rate at which the media stream flows out of the buffer in the first time period may be understood as the average rate at which the first device sends the media stream to the downstream device of the first device in the first time period. A method for determining the rate difference includes: separately determining the first time period T1 in which the buffer usage rises from the first threshold to the second threshold, traffic I1 of the media stream that flows in the buffer in the first time period, and the traffic O1 of the media stream that flows out of the buffer in the first time period, where the average rate of the media stream that flows in the buffer in the first time period is I1/T1, the average rate at which the media stream flows out of the buffer in the first time period is O1/T1, and the rate difference D=I1/T1−O1/T1. For example, the fourth threshold may be set to 2O1/T1. If the determined rate difference is greater than the fourth threshold, the first device instructs the second device to send the media stream to the first device at the second rate. If the determined rate difference is not greater than the fourth threshold, the first device does not need to instruct the second device to send the media stream to the first device at the second rate, and the second device continues sending the media stream to the first device at the first rate.

In part 302, the first device starts to detect the rate of the media stream when the buffer usage reaches the first threshold. In this scenario, to reduce overheads generated by detecting the rate of the media stream, during setting of the first threshold, the first threshold should not be set to an excessively small value, and a difference between the first threshold and the second threshold should not be excessively small. In this embodiment, after the buffer usage of the first device reaches the first threshold, if the buffer usage falls below the first threshold before reaching the second threshold, the first device may stop detecting the rate of the media stream, to reduce overheads generated by detecting the rate of the media stream.

It should be noted that, in this embodiment, the first device may start to detect the rate of the media stream when the buffer usage reaches a particular threshold. For example, the first device may start to detect the rate of the media stream when the buffer usage reaches the first threshold. The first device may alternatively detect the rate of the media stream in real time. This is not limited in this embodiment.

303. The second device sends the media stream to the first device at the second rate.

In part 303, after receiving a message that is sent by the first device and that is used to instruct the second device to send the media stream to the first device at the second rate, the second device sends the media stream to the first device at the second rate. Because the second rate is less than the first rate, the rate at which the second device sends the media stream to the first device may be reduced before the traffic overload phenomenon occurs on the first device, thereby reducing the probability that the traffic overload phenomenon occurs on the first device.

304. When determining that the buffer usage rises from the second threshold to a third threshold, the first device instructs, based on a rate that is of a media stream and that is detected in a second time period in which the buffer usage rises from the second threshold to the third threshold, the second device to send a media stream to the first device at a third rate, where the third rate is not greater than the second rate.

The second threshold and the third threshold are two of the plurality of specified buffer usage thresholds in this embodiment, and the buffer usage of the first device is compared with the second threshold and the third threshold, to determine whether the traffic overload phenomenon has occurred on the first device. In part 304, when the buffer usage of the first device rises from the second threshold to the third threshold, it indicates that the traffic overload phenomenon may have occurred on the first device. In this case, the first device instructs, based on the rate that is of the media stream and that is detected in the second time period in which the buffer usage rises from the second threshold to the third threshold, the second device to send the media stream to the first device at the third rate, where the third rate is usually less than the second rate, so that the rate at which the second device sends the media stream is further reduced when the traffic overload phenomenon occurs on the first device, thereby alleviating the traffic overload phenomenon on the first device. The third threshold may be set to a buffer usage of the first device generated when the traffic overload phenomenon occurs on the first device. For example, the second threshold may be set to one half of the buffer, and the third threshold may be set to three quarters of the buffer.

In part 304, the first device instructs, based on the rate that is of the media stream and that is detected in the second time period in which the buffer usage rises from the second threshold to the third threshold, the second device to send the media stream to the first device at the third rate, and the third rate is equal to an average rate at which a media stream flows out of the buffer in the second time period. In this case, the third rate may be understood as an average rate at which the first device sends a media stream to the downstream device of the first device in the second time period. A method for determining the third rate includes: separately determining the second time period T2 in which the buffer usage rises from the second threshold to the third threshold, and traffic O2 of the media stream that flows out of the buffer in the second time period, to obtain a ratio of O2 to T2 through calculation, that is, V2=O2/T2; if V2 is less than V1, using V2 as the third rate, where the third rate is less than the second rate in this case; and if V2 is greater than or equal to V1, using V1 as the third rate, where the third rate is equal to the second rate in this case. When the third rate is equal to the second rate, the first device may instruct the second device to send the media stream to the first device at the third rate, or the first device may not notify the second device of a rate of sending the media stream to the first device. In this case, the second device continues sending the media stream to the first device at the second rate.

305. The second device sends the media stream to the first device at the third rate.

In part 305, after receiving a message that is sent by the first device and that is used to instruct the second device to send the media stream to the first device at the third rate, the second device sends the media stream to the first device at the third rate. Because the third rate is usually less than the second rate, the rate at which the second device sends the media stream may be further reduced when the traffic overload phenomenon occurs on the first device, to alleviate the traffic overload phenomenon on the first device.

In the foregoing method in this embodiment, the rate at which the second device sends the media stream to the first device may be reduced, to alleviate the traffic overload phenomenon on the first device. After the traffic overload phenomenon on the first device is alleviated, to recover normal media stream transmission between the first device and the second device, the rate at which the second device sends the media stream to the first device may be increased by using the following method in this embodiment. The method includes the following operations.

306. When determining that the buffer usage falls from the third threshold to the second threshold, the first device instructs, based on a rate that is of a media stream and that is detected in a third time period in which the buffer usage falls from the third threshold to the second threshold, the second device to send a media stream to the first device at a fourth rate, where the fourth rate is greater than the third rate.

In part 306, the fourth rate may be determined by using a plurality of methods, so that the fourth rate is greater than the third rate, to increase the rate at which the second device sends the media stream to the first device. In the prior art, after the traffic overload phenomenon on the first device is alleviated, the second device directly restores the first rate to send the media stream to the first device. The first rate is a rate at which the second device sends the media stream before the rate at which the second device sends the media stream is reduced by using parts 301 to 305 in this embodiment. As a result, the traffic overload phenomenon may still occur on the first device. Therefore, during setting of the fourth rate, the fourth rate should be greater than the third rate and less than the first rate.

For example, the fourth rate may be equal to an average value of a smaller value and the first rate, and the smaller value is a smaller value in the second rate and the third rate, that is, the rate=(min(the second rate, the third rate)+the first rate)/2.

In part 306, when determining that the buffer usage falls from the third threshold to the second threshold, the first device may send, to the second device, a message used to instruct the second device to send the media stream to the first device at the fourth rate, or may send, to the second device, a message used to instruct the second device to increase the rate to send the media stream to the first device. In this case, the second device determines the fourth rate, and a method for determining the fourth rate by the second device is the same as that of the first device.

307. The second device sends the media stream to the first device at the fourth rate.

In part 307, after receiving the message that is sent by the first device and that is used to instruct the second device to send the media stream to the first device at the fourth rate, the second device sends the media stream to the first device at the fourth rate. Because the fourth rate is greater than the third rate, the rate at which the second device sends the media stream to the first device may be increased.

308. When determining that the buffer usage falls from the second threshold to the first threshold, the first device instructs, based on a rate that is of a media stream and that is detected in a fourth time period in which the buffer usage falls from the second threshold to the first threshold, the second device to send a media stream to the first device at a fifth rate, where the fifth rate is greater than the fourth rate.

In part 308, the fifth rate may be determined by using a plurality of methods, so that the fifth rate is greater than the fourth rate, to increase the rate at which the second device sends the media stream to the first device. For example, the fifth rate may be equal to the first rate.

In part 308, when determining that the buffer usage falls from the second threshold to the first threshold, the first device may send, to the second device, the message used to instruct the second device to send the media stream to the first device at the fifth rate, or may send, to the second device, a message used to instruct the second device to increase the rate to send the media stream to the first device. In this case, the second device determines the fifth rate, and a method for determining the fifth rate by the second device is the same as that of the first device.

309. The second device sends the media stream to the first device at the fifth rate.

In part 309, after receiving the message that is sent by the first device and that is used to instruct the second device to send the media stream to the first device at the fifth rate, the second device sends the media stream to the first device at the fifth rate. Because the fifth rate is greater than the fourth rate, the rate at which the second device sends the media stream to the first device may be increased.

It should be noted that the first threshold, the second threshold, and the third threshold in parts 306 to 309 may be correspondingly the same as or different from the first threshold, the second threshold, and the third threshold in 301 to 305, and the first threshold, the second threshold, and the third threshold in 306 to 309 are incremented.

By using parts 306 to 309, after the traffic overload phenomenon on the first device is alleviated, the rate at which the second device sends the media stream to the first device may be increased in two phases, to recover normal media stream transmission between the first device and the second device. Compared with the prior art, in the method provided in parts 306 to 309, the following problem can be avoided: After the traffic overload phenomenon on the first device is alleviated, the traffic overload phenomenon still occurs on the first device because the second device directly restores the first rate to send the media stream to the first device.

In parts 301 to 309 of this embodiment, when the first device instructs the second device to send the media stream to the first device at a specified rate, the first device may send, to the second device, a PAUSE frame that carries the specified rate, and the specified rate may be any one of the second rate to the fifth rate. A format of the PAUSE frame is described as follows:

1. In the scenario in which only one virtual channel is created on the transmission link between one port of the first device and one port of the second device, the PAUSE frame that carries the specified rate may use a frame format shown in FIG. 4. The following describes each field in the PAUSE frame shown in FIG. 4.

A destination MAC field is used to indicate a MAC address of a device that receives the PAUSE frame. In this embodiment, the destination MAC field is used to indicate a MAC address of the second device.

A source MAC field is used to indicate a MAC address of a device that sends the PAUSE frame. In this embodiment, the source MAC field is used to indicate a MAC address of the first device.

A length/type field is a hexadecimal number 0x8808.

An operation code (Opcode) field is used to indicate a MAC control frame type of a frame in which the Opcode field is located. In this embodiment, the PAUSE frame in which the Opcode field is located is one type of MAC control frame. For example, a value of the Opcode field may be 0x0001. After receiving the PAUSE frame, the device determines, based on the Opcode field in the PAUSE frame, which field in the PAUSE frame needs to be parsed. In this embodiment, after receiving the PAUSE frame, the second device parses a reserved field in the PAUSE frame. The reserved field is used to indicate the specified rate that is used when the second device sends the media stream to the first device and that is notified by the first device. The specified rate may be any one of the second rate to the fifth rate.

The reserved field is used to indicate the specified rate that is used when the second device sends the media stream to the first device and that is notified by the first device in this embodiment. The specified rate may be any one of the second rate to the fifth rate. For example, the specified rate is indicated by using 15 bits in the reserved field. The reserved field may further indicate that the PAUSE frame in which the reserved field is located is used to instruct the second device to reduce a rate or increase a rate. Further, the reserved field may further indicate a phase of the PAUSE frame in which the reserved field is located. The phase may be a phase in which the buffer usage of the first device rises from the first threshold to the second threshold in part 302, or a phase in which the buffer usage of the first device rises from the second threshold to the third threshold in part 304, or a phase in which the buffer usage of the first device falls from the third threshold to the second threshold in part 306, or a phase in which the buffer usage of the first device falls from the second threshold to the first threshold in part 308. When the specified rate indicated by the reserved field is zero, it may indicate that the first device instructs the second device to increase the rate at which the second device sends the media stream to the first device, and a rate obtained after the increase is determined by the second device.

MAC control parameters field: In the prior art, the MAC Control Parameters field is used to indicate a time length for which a receive end device of a media stream instructs a transmit end device of the media stream to suspend sending the media stream. The MAC Control Parameters field is a 2-byte unsigned number, and a value range is 0 to 65535. It is assumed that a value of the MAC Control Parameters field is M, it indicates that the time length for which the receive end device of the media stream instructs the transmit end device of the media stream to suspend sending the media stream is M×a time required by a physical layer chip to send 512-bit data.

A frame check sequence (FCS) field is used by the second device to determine whether an error occurs in the received PAUSE frame.

2. In the scenario in which a plurality of virtual channels are created on the transmission link between one port of the first device and one port of the second device, that eight virtual channels are created is used as an example, and the PAUSE frame that carries the specified rate may use a frame format shown in FIG. 5. The PAUSE frame is used for priority-based flow control (PFC). The specified rate carried by the PAUSE frame is the rate at which the second device sends, by using one virtual channel on the transmission link between the second device and the first device, the media stream corresponding to the specified priority. The following describes each field in the PAUSE frame shown in FIG. 5.

For descriptions of a destination MAC field, a source MAC field, a Length/Type field, and an FCS field in FIG. 5, refer to the descriptions of the fields in FIG. 4 above. Details are not described herein again.

A PFC field has a similar function to that of an Opcode field in FIG. 4, and is used to indicate a MAC control frame type of a frame in which the PFC field is located is. In this embodiment, the PAUSE frame in which the PFC field is located is one type of MAC control frame. For example, a value of the Opcode field may be 0x0101. After receiving the PAUSE frame, the device determines, based on the Opcode field in the PAUSE frame, which field in the PAUSE frame needs to be parsed. In this embodiment, after receiving the PAUSE frame, the second device parses a reserved field in the PAUSE frame based on an indication of the PFC field, or obtains, based on an EN field and a Time[0] field to a Time[7] field in the PAUSE frame, the specified rate that is used when the second device sends the media stream to the first device and that is notified by the first device. The specified rate may be any one of the second rate to the fifth rate. The specified rate is the rate at which the second device sends, by using one virtual channel on the transmission link between the second device and the first device, the media stream corresponding to the specified priority.

Reserved field: In this embodiment, the reserved field may be used to indicate the specified rate that is used when the second device sends the media stream to the first device and that is notified by the first device. The specified rate may be any one of the second rate to the fifth rate. The specified rate is the rate at which the second device sends, by using one virtual channel on the transmission link between the second device and the first device, the media stream corresponding to the specified priority, and the media stream of the specified priority corresponding to the specified rate may be indicated by using the reserved field or the enable (EN) field. For example, the specified rate may be indicated by using 12 bits in the reserved field, and the media stream of the specified priority corresponding to the specified rate may be indicated by using 3 bits in the reserved field or the EN field. The reserved field may further indicate that the PAUSE frame in which the reserved field is located is used to instruct the second device to reduce a rate or increase a rate. Further, the reserved field may further indicate a phase of the PAUSE frame in which the reserved field is located. The phase may be a phase in which the buffer usage of the first device rises from the first threshold to the second threshold in part 302, or a phase in which the buffer usage of the first device rises from the second threshold to the third threshold in part 304, or a phase in which the buffer usage of the first device falls from the third threshold to the second threshold in part 306, or a phase in which the buffer usage of the first device falls from the second threshold to the first threshold in part 308. When the specified rate indicated by the reserved field is zero, it may indicate that the first device instructs the second device to increase the rate at which the second device sends the media stream to the first device, and a rate obtained after the increase is determined by the second device.

EN field and Time[0] field to Time[7] field: In the prior art, the EN field is used to indicate a media stream of a specified priority, indicating that a receive end device of the media stream instructs a transmit end device of the media stream to suspend sending the media stream of the specified priority. Time[0] to Time[7] are respectively corresponding to eight priorities. Time[n] is used to indicate a time length, indicating a time length for which the receive end device of the media stream instructs the transmit end device of the media stream to suspend sending a media stream of a priority corresponding to Time[n].

In this embodiment, when the reserved field is used to indicate the specified rate that is used when the second device sends the media stream to the first device and that is notified by the first device, the EN field may be used to indicate the media stream of the specified priority corresponding to the specified rate. In this embodiment, when the reserved field is not used to indicate the specified rate that is used when the second device sends the media stream to the first device and that is notified by the first device, the EN field may be used to indicate the media stream of the specified priority, indicating that the receive end device of the media stream instructs the transmit end device of the media stream to adjust a rate of sending the media stream of the specified priority. Time[0] to Time[7] are respectively corresponding to eight priorities. Time[n] is used to indicate a specified rate, indicating that the first device instructs the second device to send, to the first device at the specified rate, a media stream of a priority corresponding to Time[n], and a value range of n is 0 to 7. Time[n] may further indicate that the PAUSE frame in which Time[n] is located is used to instruct the second device to reduce a rate or increase a rate. Further, Time[n] may further indicate a phase of the PAUSE frame in which Time[n] is located. The phase may be the phase in which the buffer usage of the first device rises from the first threshold to the second threshold in part 302, or the phase in which the buffer usage of the first device rises from the second threshold to the third threshold in part 304, or the phase in which the buffer usage of the first device falls from the third threshold to the second threshold in part 306, or the phase in which the buffer usage of the first device falls from the second threshold to the first threshold in part 308. When the specified rate indicated by Time[n] is zero, it may indicate that the first device instructs the second device to increase the rate at which the second device sends the media stream to the first device, and a rate obtained after the increase is determined by the second device.

The first device sends, to the second device, the PAUSE frame that carries the specified rate, so that the first device instructs the second device to send the media stream to the first device at the specified rate without changing an existing frame format of the PAUSE frame, thereby fully exploiting and playing a function of the PAUSE frame. After receiving the PAUSE frame that carries the specified rate, the second device adjusts the rate of sending the media stream to the first device to the specified rate, to implement flow control in the process of transmitting the media stream between the first device and the second device.

In this embodiment, in the scenario in which a plurality of virtual channels are created on the transmission link between one port of the first device and one port of the second device, the second device can adjust, by using the foregoing frame format, the rate of sending the media stream of the specified priority to the first device by using one or more virtual channels. For media streams of different priorities that are sent by the second device to the first device by using a plurality of virtual channels, adjusted rates used for sending the media streams of the different priorities may be the same or different. In this embodiment, a plurality of methods may be used to, so that the adjusted rates used for sending the media streams of the different priorities by the second device are the same or different. For example, the first device sends one or more PAUSE frames that carry a plurality of specified rates to the second device. The one or more PAUSE frames further indicate that the plurality of specified rates are corresponding to media streams of different priorities, and the second device sends the media stream based on the indication of the PAUSE frame. For another example, the first device sends a PAUSE frame that carries one specified rate to the second device. The PAUSE frame further indicates that the specified rate is corresponding to media streams of different priorities. After receiving the PAUSE frame, the second device may separately send the media streams of the different priorities by using the specified rate, or may separately multiply the specified rate by priority coefficients corresponding to the different priorities, and then send media streams of corresponding priorities by using specified rates obtained by multiplying by the priority coefficients. The priority coefficient $a=(n-i)/n$ is used as an example, and a rate at which the second device sends a media stream corresponding to a priority n is: the specified rate$*[(n-i)/n]$.

Figure 6:
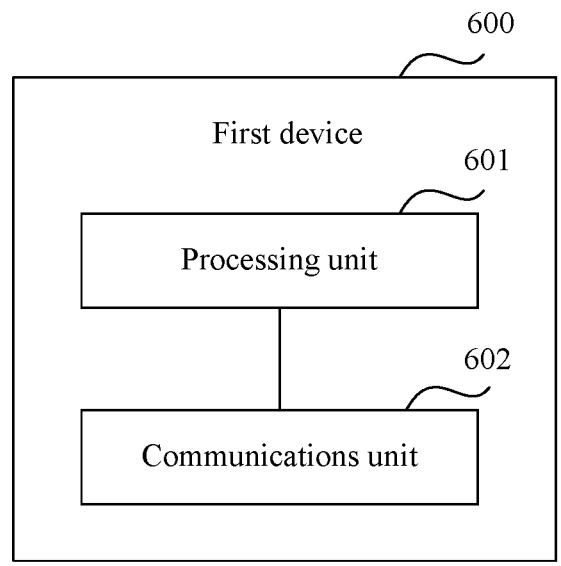
FIG. 6 is a schematic structural diagram of a first device according to an embodiment of this application.

Based on an inventive concept, an embodiment of this application further provides a first device, and the first device may perform a method on a first device side in the flow control method shown in FIG. 3B. Referring to FIG. 6, a first device 600 includes a processing unit 601 and a communications unit 602.

The processing unit 601 is configured to receive, by using the communications unit 602, a media stream that is sent by a second device at a first rate.

The processing unit 601 is further configured to: when determining that a buffer usage of the first device rises from a first threshold to a second threshold, instruct, by using the communications unit 602 based on a rate that is of a media stream and that is detected in a first time period in which the buffer usage rises from the first threshold to the second threshold, the second device to send a media stream to the first device at a second rate, where the second rate is less than the first rate; and when determining that the buffer usage rises from the second threshold to a third threshold, instruct, by using the communications unit 602 based on a rate that is of a media stream and that is detected in a second time period in which the buffer usage rises from the second threshold to the third threshold, the second device to send a media stream to the first device at a third rate, where the third rate is not greater than the second rate.

The communications unit 602 is configured to receive data and/or send data under control of the processing unit 601.

In one embodiment, the second rate is an average rate at which a media stream flows out of a buffer in the first time period.

In one embodiment, when instructing, by using the communications unit 602 based on the rate that is of the media stream and that is detected in the first time period in which the buffer usage rises from the first threshold to the second threshold, the second device to send the media stream to the first device at the second rate, the processing unit 601 is configured to:

when determining that a rate difference is greater than a fourth threshold, instruct, by using the communications unit 602, the second device to send the media stream to the first device at the second rate, where the rate difference is a difference between an average rate at which a media stream flows in the buffer in the first time period and the average rate at which the media stream flows out of the buffer in the first time period.

In one embodiment, the third rate is an average rate at which a media stream flows out of the buffer in the second time period.

In one embodiment, the buffer includes:

all buffers of one port; and/or a buffer used to buffer a media stream corresponding to a specified priority in all buffers of one port.

In one embodiment, when instructing, by using the communications unit 602, the second device to send the media stream to the first device at the second rate or the third rate, the processing unit 601 is configured to:

send, to the second device by using the communications unit 602, a pause (PAUSE) frame that carries the second rate or the third rate.

In one embodiment, the processing unit 601 is further configured to:

when determining that the buffer usage falls from the third threshold to the second threshold, instruct, by using the communications unit 602 based on a rate that is of a media stream and that is detected in a third time period in which the buffer usage falls from the third threshold to the second threshold, the second device to send a media stream to the first device at a fourth rate, where the fourth rate is greater than the third rate; and when determining that the buffer usage falls from the second threshold to the first threshold, instruct, by using the communications unit 602 based on a rate that is of a media stream and that is detected in a fourth time period in which the buffer usage falls from the second threshold to the first threshold, the second device to send a media stream to the first device at a fifth rate, where the fifth rate is greater than the fourth rate.

It should be noted that for function descriptions of the foregoing units, refer to the flow control method shown in FIG. 3B. Details are not described herein again. In this embodiment of this application, unit division is an example, and is merely a logical function division. In actual implementation, another division manner may be used. The integrated unit may be implemented in a form of hardware, or may be implemented in a form of a software functional unit.

When the integrated unit is implemented in the form of a software functional unit and sold or used as an independent product, the integrated unit may be stored in a computer-readable storage medium. Based on such an understanding, the technical solutions of this application essentially, or the part contributing to the prior art, or all or some of the technical solutions may be implemented in the form of a software product. The computer software product is stored in a storage medium and includes several instructions for instructing a computer device (which may be a personal computer, a server, a network device, or the like) or a processor to perform all or some of the steps or operations of the methods in the embodiments of this application. The foregoing storage medium includes: any medium that can store program code, such as a USB flash drive, a removable hard disk, a read-only memory (ROM), a random access memory (RAM), a magnetic disk, or an optical disc.

Figure 7:
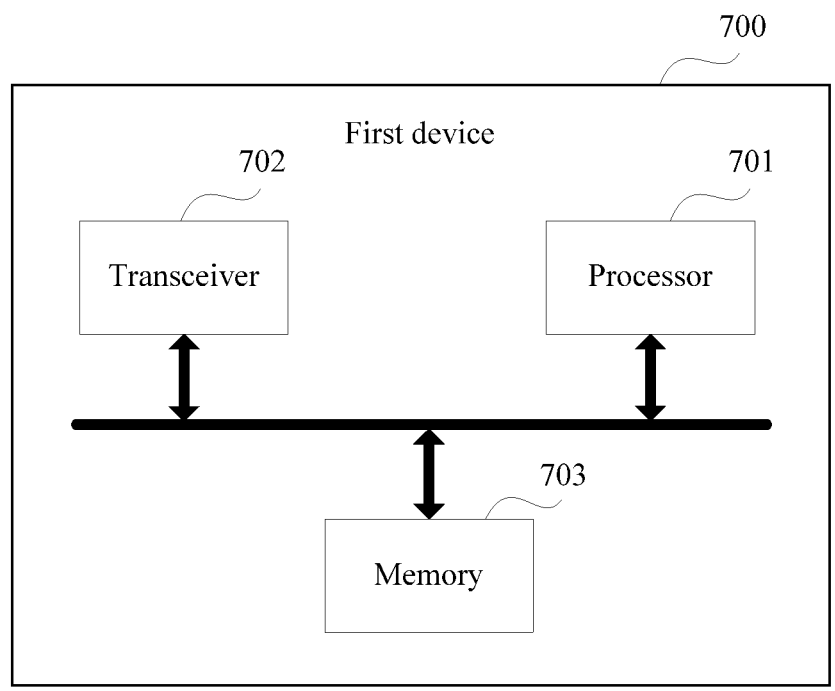
FIG. 7 is a schematic structural diagram of another first device according to an embodiment of this application.

Based on an inventive concept, an embodiment of this application further provides a first device, and the first device may perform a method on a first device side in the flow control method provided in FIG. 3B, and may be a device that is the same as the first device shown in FIG. 6. Referring to FIG. 7, a first device 700 includes a processor 701, a transceiver 702, and a memory 703. The processor 701 may be the processing unit 601 in FIG. 6, and the transceiver 702 may be the communications unit 602 in FIG. 6.

The processor 701 is configured to read a program in the memory 703, to perform the following process:

receiving, by using the transceiver 702, a media stream that is sent by a second device at a first rate; when determining that a buffer usage of the first device rises from a first threshold to a second threshold, instructing, by using the transceiver 702 based on a rate that is of a media stream and that is detected in a first time period in which the buffer usage rises from the first threshold to the second threshold, the second device to send a media stream to the first device at a second rate, where the second rate is less than the first rate; and when determining that the buffer usage rises from the second threshold to a third threshold, instructing, by using the transceiver 702 based on a rate that is of a media stream and that is detected in a second time period in which the buffer usage rises from the second threshold to the third threshold, the second device to send a media stream to the first device at a third rate, where the third rate is not greater than the second rate.

The transceiver 702 is configured to receive data and/or send data under control of the processor 701.

In one embodiment, the second rate is an average rate at which a media stream flows out of a buffer in the first time period.

In one embodiment, when instructing, by using the transceiver 702 based on the rate that is of the media stream and that is detected in the first time period in which the buffer usage rises from the first threshold to the second threshold, the second device to send the media stream to the first device at the second rate, the processor 701 is configured to:

when determining that a rate difference is greater than a fourth threshold, instruct, by using the transceiver 702, the second device to send the media stream to the first device at the second rate, where the rate difference is a difference between an average rate at which a media stream flows in the buffer in the first time period and the average rate at which the media stream flows out of the buffer in the first time period.

In one embodiment, the third rate is an average rate at which a media stream flows out of the buffer in the second time period.

In one embodiment, the buffer includes:

all buffers of one port; and/or a buffer used to buffer a media stream corresponding to a specified priority in all buffers of one port.

In one embodiment, when instructing, by using the transceiver 702, the second device to send the media stream to the first device at the second rate or the third rate, the processor 701 is configured to:

send, to the second device by using the transceiver 702, a pause (PAUSE) frame that carries the second rate or the third rate.

In one embodiment, the processor 701 is further configured to:

when determining that the buffer usage falls from the third threshold to the second threshold, instruct, by using the transceiver 702 based on a rate that is of a media stream and that is detected in a third time period in which the buffer usage falls from the third threshold to the second threshold, the second device to send a media stream to the first device at a fourth rate, where the fourth rate is greater than the third rate; and when determining that the buffer usage falls from the second threshold to the first threshold, instruct, by using the transceiver 702 based on a rate that is of a media stream and that is detected in a fourth time period in which the buffer usage falls from the second threshold to the first threshold, the second device to send a media stream to the first device at a fifth rate, where the fifth rate is greater than the fourth rate.

The memory 703 may store data used when the processor 701 performs an operation, and the memory 703 may be a memory of a physical host that carries an SDN controller, such as a hard disk, a USB flash drive, or a secure digital (SD) card.

An embodiment of this application further provides a computer storage medium, configured to store a computer software instruction used by the first device in the foregoing embodiment of this application, where the computer software instruction includes a program designed for performing the foregoing embodiment.

Figure 8:
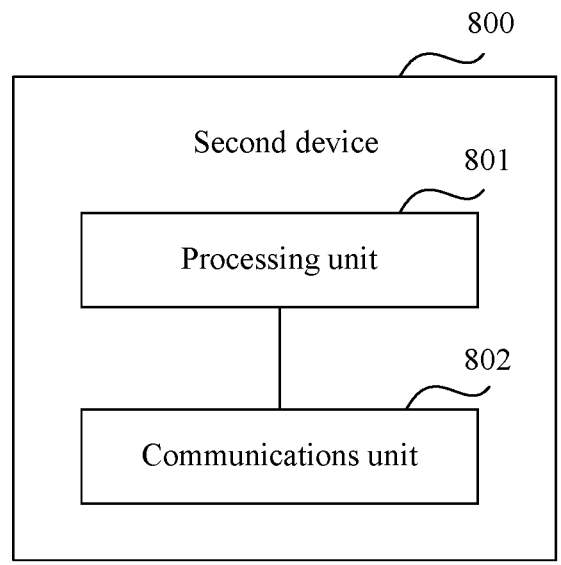
FIG. 8 is a schematic structural diagram of a second device according to an embodiment of this application.

Based on an inventive concept, an embodiment of this application further provides a second device, and the second device may perform a method on a second device side in the flow control method shown in FIG. 3B. Referring to FIG. 8, a second device 800 includes a processing unit 801 and a communications unit 802.

The processing unit 801 is configured to: send a media stream to a first device at a first rate by using the communications unit 802; after receiving, by using the communications unit 802, a message that is sent by the first device and that is used to instruct the second device to send a media stream to the first device at a second rate, send, by using the communications unit 802, the media stream to the first device at the second rate, where the second rate is less than the first rate; and after receiving, by using the communications unit 802, a message that is sent by the first device and that is used to instruct the second device to send a media stream to the first device at a third rate, send, by using the communications unit 802, the media stream to the first device at the third rate, where the third rate is not greater than the second rate.

The communications unit 802 is configured to receive data and/or send data under control of the processing unit 801.

In one embodiment, the second rate is an average rate at which a media stream flows out of a buffer in a first time period in which a buffer usage of the first device rises from a first threshold to a second threshold.

In one embodiment, the third rate is an average rate at which a media stream flows out of the buffer in a second time period in which the buffer usage of the first device rises from the second threshold to a third threshold.

In one embodiment, the buffer includes:

all buffers of one port; and/or a buffer used to buffer a media stream corresponding to a specified priority in all buffers of one port.

In one embodiment, when receiving, by using the communications unit 802, the message that is sent by the first device and that is used to instruct the second device to send the media stream to the first device at the second rate or the third rate, the processing unit 801 is configured to:

receive, by using the communications unit 802, a pause (PAUSE) frame that is sent by the first device and that carries the second rate or the third rate.

In one embodiment, the processing unit 801 is further configured to:

after receiving, by using the communications unit 802, a message that is sent by the first device and that is used to instruct the second device to send a media stream to the first device at a fourth rate, send the media stream to the first device at the fourth rate by using the communications unit 802, where the fourth rate is greater than the third rate; and after receiving, by using the communications unit 802, a message that is sent by the first device and that is used to instruct the second device to send a media stream to the first device at a fifth rate, send the media stream to the first device at the fifth rate by using the communications unit 802, where the fifth rate is greater than the fourth rate.

Figure 9:
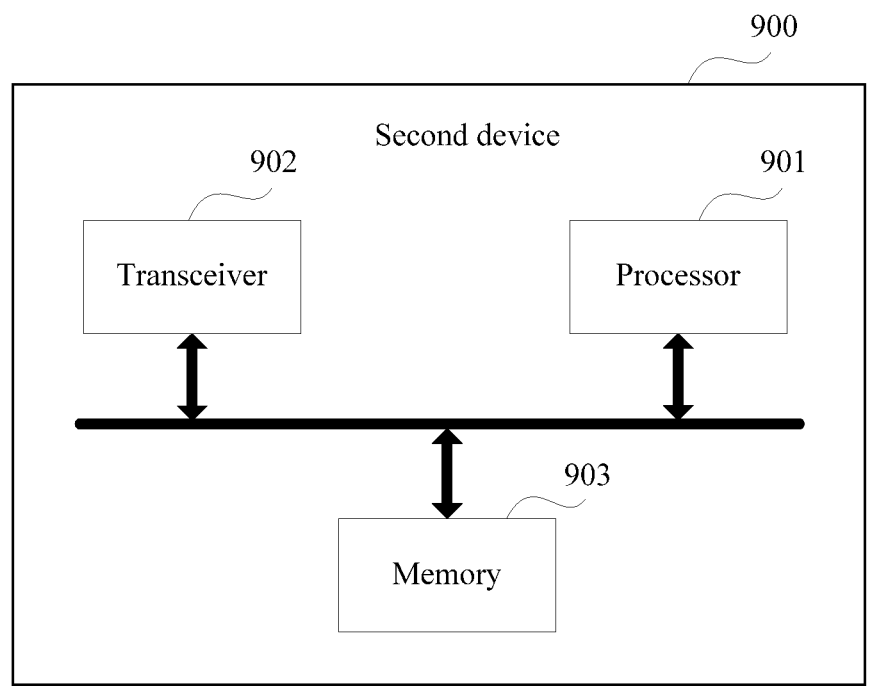
FIG. 9 is a schematic structural diagram of another second device according to an embodiment of this application.

Based on an inventive concept, an embodiment of this application further provides a second device, and the second device may perform a method on a second device side in the flow control method provided in FIG. 3B, and may be a device that is the same as the second device shown in FIG. 8. Referring to FIG. 9, a second device 900 includes a processor 901, a transceiver 902, and a memory 903. The processor 901 may be the processing unit 801 in FIG. 8, and the transceiver 902 may be the communications unit 802 in FIG. 8.

The processor 901 is configured to read a program in memory 903, to perform the following process:

sending a media stream to a first device at a first rate by using the transceiver 902; after receiving, by using the transceiver 902, a message that is sent by the first device and that is used to instruct the second device to send a media stream to the first device at a second rate, sending, by using the transceiver 902, the media stream to the first device at the second rate, where the second rate is less than the first rate; and after receiving, by using the transceiver 902, a message that is sent by the first device and that is used to instruct the second device to send a media stream to the first device at a third rate, sending, by using the transceiver 902, the media stream to the first device at the third rate, where the third rate is not greater than the second rate.

The transceiver 902 is configured to receive data and/or send data under control of the processor 901.

In one embodiment, the second rate is an average rate at which a media stream flows out of a buffer in a first time period in which a buffer usage of the first device rises from a first threshold to a second threshold.

In one embodiment, the third rate is an average rate at which a media stream flows out of the buffer in a second time period in which the buffer usage of the first device rises from the second threshold to a third threshold.

In one embodiment, the buffer includes:

all buffers of one port; and/or a buffer used to buffer a media stream corresponding to a specified priority in all buffers of one port.

In one embodiment, when receiving, by using the transceiver 902, the message that is sent by the first device and that is used to instruct the second device to send the media stream to the first device at the second rate or the third rate, the processor 901 is configured to:

receive, by using the transceiver 902, a pause PAUSE frame that is sent by the first device and that carries the second rate or the third rate.

In one embodiment, the processor 901 is further configured to:

after receiving, by using the transceiver 902, a message that is sent by the first device and that is used to instruct the second device to send a media stream to the first device at a fourth rate, send the media stream to the first device at the fourth rate by using the transceiver 902, where the fourth rate is greater than the third rate; and after receiving, by using the transceiver 902, a message that is sent by the first device and that is used to instruct the second device to send a media stream to the first device at a fifth rate, send the media stream to the first device at the fifth rate by using the transceiver 902, where the fifth rate is greater than the fourth rate.

An embodiment of this application further provides a computer storage medium, configured to store a computer software instruction used by the second device in the foregoing embodiment of this application, where the computer software instruction includes a program designed for performing the foregoing embodiment.

Figure 10:
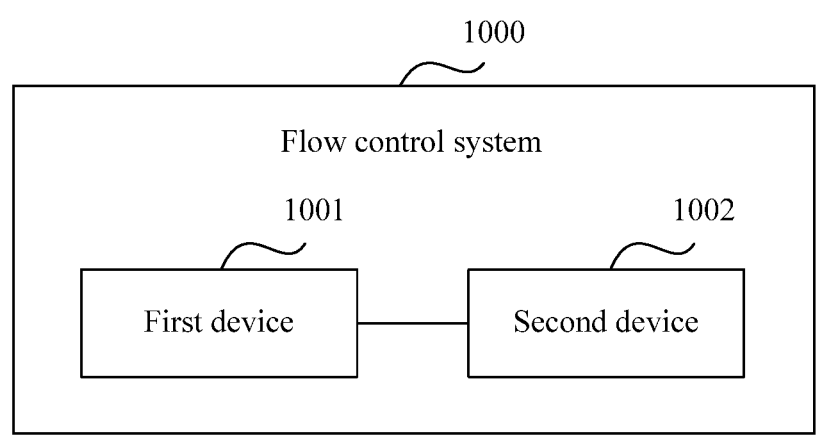
FIG. 10 is a schematic structural diagram of a flow control system according to an embodiment of this application.

Based on an inventive concept, an embodiment of this application further provides a flow control system, including a first device and a second device that are provided in the embodiments of this application. Referring to FIG. 10, the flow control system 1000 includes a first device 1001 and a second device 1002.

The second device 1002 is configured to send a media stream to the first device 1001 at a first rate.

The first device 1001 is configured to: when determining that a buffer usage rises from a first threshold to a second threshold, send, to the second device 1002 based on a rate that is of a media stream and that is detected in a first time period in which the buffer usage rises from the first threshold to the second threshold, a first message that is used to instruct the second device 1002 to send a media stream to the first device 1001 at a second rate, where the second rate is less than the first rate; and when determining that the buffer usage rises from the second threshold to a third threshold, send, to the second device 1002 based on a rate that is of a media stream and that is detected in a second time period in which the buffer usage rises from the second threshold to the third threshold, a second message that is used to instruct the second device 1002 to send a media stream to the first device 1001 at a third rate, where the third rate is not greater than the second rate.

The second device 1002 is further configured to: after receiving the first message, send the media stream to the first device 1001 at the second rate; and after receiving the second message, send the media stream to the first device 1001 at the third rate.

It should be noted that for function descriptions of the first device 1001 and the second device 1002, refer to the flow control method and the devices shown in FIG. 3B. Details are not described herein again.

According to the technical solutions provided in the embodiments of this application, flow control in the process of transmitting the media stream between the devices can be implemented. In addition, with the technical solutions provided in the embodiments of this application, the following case in the existing flow control solution can be avoided: The transmit end device suspends sending the media stream to the receive end device when traffic overload occurs on the receive end device. Therefore, by using the technical solutions provided in the embodiments of this application, the following problem in the existing flow control solution can be avoided: The transmit end device discards a data packet because the transmit end device suspends sending the media stream when traffic overload occurs on the receive end device.

A person skilled in the art should understand that the embodiments of this application may be provided as a method, a system, or a computer program product. Therefore, this application may use a form of hardware only embodiments, software only embodiments, or embodiments with a combination of software and hardware. Moreover, this application may use a form of a computer program product that is implemented on one or more computer-usable storage media (including but not limited to a disk memory, a CD-ROM, an optical memory, and the like) that include computer usable program code.

This application is described with reference to the flowcharts and/or block diagrams of the method, the device (system), and the computer program product according to this application. It should be understood that computer program instructions may be used to implement each process and/or each block in the flowcharts and/or the block diagrams and a combination of a process and/or a block in the flowcharts and/or the block diagrams. These computer program instructions may be provided for a general-purpose computer, a dedicated computer, an embedded processor, or a processor of any other programmable data processing device to generate a machine, so that the instructions executed by a computer or a processor of any other programmable data processing device generate an apparatus for implementing a function in one or more processes in the flowcharts and/or in one or more blocks in the block diagrams.

These computer program instructions may be stored in a computer readable memory that can instruct the computer or any other programmable data processing device to work in a manner, so that the instructions stored in the computer readable memory generate an artifact that includes an instruction apparatus. The instruction apparatus implements a function in one or more processes in the flowcharts and/or in one or more blocks in the block diagrams.

These computer program instructions may be loaded onto a computer or another programmable data processing device, so that a series of operations and steps are performed on the computer or the another programmable device, thereby generating computer-implemented processing. Therefore, the instructions executed on the computer or the another programmable device provide steps or operations for implementing a function in one or more processes in the flowcharts and/or in one or more blocks in the block diagrams.

Obviously, a person skilled in the art can make various modifications and variations to this application without departing from the spirit and scope of this application. This application is intended to cover these modifications and variations of this application provided that they fall within the scope of protection defined by the following claims and their equivalent technologies.

What is claimed is:

1. A flow control method comprising:
    receiving, by a first device, a media stream sent by a second device at a first rate;
    sending, by the first device, a media stream to a third device;
    when determining that a buffer usage rises from a first threshold to a second threshold, instructing, by the first device based on a rate of a media stream detected in a first time period in which the buffer usage rises from the first threshold to the second threshold, the second device to send a media stream to the first device at a second rate, wherein the second rate is less than the first rate, including determining that when a rate difference is greater than a fourth threshold, the first device instructs the second device to send the media stream to the first device at the second rate, wherein the rate difference is a difference between an average rate at which a media stream flows in a buffer in the first time period and an average rate at which the media stream flows out of the buffer in the first time period; and
    when determining that the buffer usage rises from the second threshold to a third threshold, instructing, by the first device based on a rate of a media stream detected in a second time period in which the buffer usage rises from the second threshold to the third threshold, the second device to send a media stream to the first device at a third rate, wherein the third rate is not greater than the second rate, wherein the instructing, by the first device, the second device to send a media stream to the first device at the second rate or the third rate includes sending, by the first device to the second device, a pause frame that carries the second rate or the third rate;
    wherein the first device is a switching device, the first device is adjacent to the second device, the third device is adjacent to the first device.

2. The method according to claim 1, wherein the second rate is an average rate at which a media stream flows out of a buffer in the first time period.

3. The method according to claim 1, wherein the third rate is an average rate at which a media stream flows out of the buffer in the second time period.

4. The method according to claim 1, wherein the buffer comprises:
    all buffers of one port.

5. The method according to claim 1, wherein the buffer comprises:
    a buffer used to buffer a media stream corresponding to a specified priority in all buffers of one port.

6. The method according to claim 1, further comprising:
when determining that the buffer usage falls from the third threshold to the second threshold, instructing, by the first device based on a rate of a media stream detected in a third time period in which the buffer usage falls from the third threshold to the second threshold, the second device to send a media stream to the first device at a fourth rate, wherein the fourth rate is greater than the third rate; and
when determining that the buffer usage falls from the second threshold to the first threshold, instructing, by the first device based on a rate of a media stream detected in a fourth time period in which the buffer usage falls from the second threshold to the first threshold, the second device to send a media stream to the first device at a fifth rate, wherein the fifth rate is greater than the fourth rate.

7. A flow control method comprising:
sending, by a second device, a media stream to a first device at a first rate;
after receiving a message sent by the first device used to instruct the second device to send a media stream to the first device at a second rate, sending, by the second device, the media stream to the first device at the second rate, wherein the second rate is less than the first rate, wherein the message is received when a rate difference is determined to be greater than a fourth threshold, wherein the rate difference is a difference between an average rate at which a media stream flows in a buffer of the first device in a first time period and an average rate at which the media stream flows out of the buffer of the first device in the first time period; and
after receiving a message sent by the first device used to instruct the second device to send a media stream to the first device at a third rate, sending, by the second device, the media stream to the first device at the third rate, wherein the third rate is not greater than the second rate, wherein the receiving, by the second device, a message sent by the first device used to instruct the second device to send a media stream to the first device at the second rate or the third rate includes receiving, by the second device, a pause frame that is sent by the first device and that carries the second rate or the third rate;
wherein the first device is a switching device, the first device is adjacent to the second device.

8. The method according to claim 7, wherein the third rate is an average rate at which a media stream flows out of the buffer in a second time period in which a buffer usage of the first device rises from a second threshold to a third threshold.

9. The method according to claim 7, wherein the buffer comprises:
all buffers of one port; and/or
a buffer used to buffer a media stream corresponding to a specified priority in all buffers of one port.

10. The method according to claim 7, further comprising:
after receiving a message sent by the first device used to instruct the second device to send a media stream to the first device at a fourth rate, sending, by the second device, the media stream to the first device at the fourth rate, wherein the fourth rate is greater than the third rate; and
after receiving a message sent by the first device used to instruct the second device to send a media stream to the first device at a fifth rate, sending, by the second device, the media stream to the first device at the fifth rate, wherein the fifth rate is greater than the fourth rate.

11. A first device comprising:
a processor,
a transceiver, and
a memory, wherein
the processor is configured to read a program in the memory, to perform the following process:
receiving, by using the transceiver, a media stream sent by a second device at a first rate;
when determining that a buffer usage of the first device rises from a first threshold to a second threshold, instructing, by using the transceiver based on a rate of a media stream detected in a first time period in which the buffer usage rises from the first threshold to the second threshold, the second device to send a media stream to the first device at a second rate, wherein the second rate is less than the first rate, including determining that when a rate difference is greater than a fourth threshold, instructing the second device to send the media stream to the first device at the second rate, wherein the rate difference is a difference between an average rate at which a media stream flows in a buffer in the first time period and an average rate at which the media stream flows out of the buffer in the first time period; and
when determining that the buffer usage rises from the second threshold to a third threshold, instructing, by using the transceiver based on a rate of a media stream detected in a second time period in which the buffer usage rises from the second threshold to the third threshold, the second device to send a media stream to the first device at a third rate, wherein the third rate is not greater than the second rate, wherein the receiving, by the second device, a message sent by the first device used to instruct the second device to send a media stream to the first device at the second rate or the third rate includes receiving, by the second device, a pause frame that is sent by the transceiver of the first device and that carries the second rate or the third rate; and
wherein, the transceiver is configured to receive data and/or send data under control of the processor;
wherein the first device is a switching device, the first device is adjacent to the second device.

12. The first device according to claim 11, wherein the second rate is an average rate at which a media stream flows out of a buffer in the first time period.

13. A second device comprising:
a processor,
a transceiver, and
a memory, wherein
the processor is configured to read a program in the memory, to perform the following process:
sending a media stream to a first device at a first rate by using the transceiver;
after receiving, by using the transceiver, a message sent by the first device used to instruct the second device to send a media stream to the first device at a second rate, sending, by using the transceiver, the media stream to the first device at the second rate, wherein the second rate is less than the first rate, wherein the message is received when a rate difference is determined to be greater than a fourth threshold, wherein the rate difference is a difference between an average rate at which a media stream flows in a buffer of the first device in a first time period and an average rate at which the media stream flows out of the buffer of the first device in the first time period; and after receiving, by using the transceiver, a message sent by the first device used to instruct the second device to send a media stream to the first device at a third rate, sending, by using the transceiver, the media stream to the first device at the third rate, wherein the third rate is not greater than the second rate, wherein the receiving, by the second device, a message sent by the first device used to instruct the second device to send a media stream to the first device at the second rate or the third rate includes receiving, by the transceiver of the second device, a pause frame that is sent by the first device and that carries the second rate or the third rate; and wherein, the transceiver is configured to receive data and/or send data under control of the processor;

wherein the first device is a switching device, the first device is adjacent to the second device.

14. The second device according to claim 13, wherein the third rate is an average rate at which a media stream flows out of the buffer in a second time period in which a buffer usage of the first device rises from a second threshold to a third threshold.

\* \* \* \* \*